Patented Apr. 27, 1948

2,440,242

UNITED STATES PATENT OFFICE 2,440,242

ESTERIFIED ROSIN MODIFIED WITH ORGANIC ACIDS AND PROCESS FOR MAKING SAME

Laszlo Auer, South Orange, N. J.

No Drawing. Application October 12, 1942,
Serial No. 461,800

11 Claims. (Cl. 260—104)

GENERAL FIELD OF INVENTION AND STATEMENT OF OBJECTS

This invention relates to treatment of rosin, and especially to treatment with certain modifying agents promoting changes in physical characteristics and properties of the rosin as will further appear. The present application is a continuation-in-part of my copending application Serial No. 318,650, filed February 12, 1940 (now Patent 2,298,270).

As is known, gum or wood rosins contain mixtures of rosin acids, known today as abietic acid, pyro-abietic acid and d-pimaric acid amongst others. Such rosins commonly have an acid value of from about 145 to 185, usually from about 160 to about 168, and in their natural state they are ordinarily hard, brittle materials, of melting point from about 70° C. to about 85° C.

Rosin is a valuable raw material for a number of commercial purposes, such as in paper sizing, soap manufacture, and especially in the coatings and plastics industries. There are, in fact, a number of examples in the art of use of various rosin derivatives for purposes such as those mentioned. Some of the most important and common examples occur in the coatings industry, i. e., use of rosin derivatives in paints, varnishes, lacquers and the like.

In its natural state, however, rosin is not well suited to many commercial purposes for which it is potentially a valuable raw material.

The primary object of the present invention is to modify various physical properties of rosin, whereby to produce modified rosin products which are better adapted to many uses for which rosin or rosin derivatives are now employed. In addition, the modifications brought about in accordance with the present invention make it possible and advantageous to use the modified rosin products for many purposes for which rosin in its natural state and also various derivatives thereof are not well suited.

To illustrate, reference is made to coating compositions, such as varnishes. When employing the modified rosin products produced in accordance with the present invention, the cooking of varnishes (usually containing fatty oil-plus resin), is accelerated, and in addition varnishes cooked with modified rosin products produced by the present method have improved drying properties.

In connection with the foregoing it is to be understood that frequently it may be desirable to further treat the modified rosin products produced by the present method prior to their use in varnishes, or for other purposes. For example, because of the fact that the acid value of the modified products is relatively high, it may be desirable to esterify the product before use, such esterification being discussed more fully hereinafter.

For certain special purposes in the soap and paper sizing industries, the modified rosin products of this invention may also be of advantage.

Some of the important modifications brought about by the process are decarboxylation, and probably also condensation, these and other modifications also being discussed more fully hereinafter. It is here noted, however, that in referring to changes of this type and in making comparisons of the modified products with products not treated with modifying agents it is to be understood that the statements regarding changes and comparisons are always made on the basis of a relation between the product treated with a modifying agent and a product treated in exactly the same manner (heating, etc.) but without a modifying agent. The latter is often herein referred to as a "blank" or "control" experiment.

THE MODIFICATION PROCESS

The process of the invention involves heating the rosin in the presence of a modifying agent of the type mentioned hereinafter, the duration of heating, temperature and other treatment conditions, as more fully explained herebelow, being controlled in accordance with the extent and type of modification desired.

In general, modifying agents employed in accordance with this invention, and also in accordance with certain of my copending applications, identified hereinafter, are polar compounds. The present application is particularly directed to the use of certain organic acids as modifying agents for rosin.

Such acids may be grouped in various ways, it being mentioned that both aliphatic and aromatic organic acids are useful in my processes.

In accordance with the foregoing classification, examples are as follows:

| Aromatic | Aliphatic |
|---|---|
| salicylic | formic |
| sulpho salicylic | acetic |
| phthalic | oxalic |
| benzoic | monochloracetic |
| 2:3 hydroxy naphthoic | trichloracetic |
| | malonic |
| | lactic |
| | propionic |
| | butyric |
| | malic |
| | succinnic |
| | tartaric |
| | isovaleric |
| | citric |
| | capric |
| | hydroxyacetic |

Some of the carboxylic acids are of especial utility, particularly polycarboxylic, one of the best groups being certain of the dicarboxylic acids. The carboxylic acids may be grouped as follows:

| Monocarboxylic | Polycarboxylic | |
|---|---|---|
| | Dicarboxylic | Tricarboxylic |
| butyric | oxalic | citric |
| propionic | tartaric | — |
| isovaleric | phthalic | |
| capric | malonic | |
| lactic | succinnic | |
| salicylic | malic | |
| sulpho salicylic | | |
| acetic | | |
| formic | | |
| benzoic | | |
| naphthenic | | |
| trichloracetic | | |
| monochloracetic | | |
| hydroxyacetic | | |
| 2:3 hydroxy naphthoic | | |

Although the acids themselves may be used, where the anhydride is commercially available, that form may also be used, for instance, succinnic anhydride.

From the above, it will be seen that the invention contemplates use of saturated organic acids.

In carrying out the process, the rosin is heated between about 100° C. and about 350° C., depending upon the agent selected and the degree and nature of modification desired. Some agents work at a temperature not above 200° C., even down to about 100° C.

Anywhere from a trace, for instance, from .01% or .5% up to about 30% by weight of the acid is employed, and I have found a particularly advantageous range with most acids to be from about 2% to about 15%.

Thorough dispersion of the modifying agent in the rosin is of importance and appropriate control of temperature and time both contribute to bringing about such thorough dispersion. Agitation may be employed to aid thorough dispersion. Usually not more than a few hours treatment will be found sufficient, for instance, from about one hour to about five hours, although in some cases the reaction proceeds very rapidly, requiring not more than about one half hour.

The reaction may be carried out either in an open or closed vessel, though not necessarily at a positive pressure. It may be mentioned that the presence of at least some air at the surface of the reaction mass will not necessarily impair the process. In the case of carrying out the reaction in a closed vessel, fumes or gases released from the reaction mass may dispel air, at least to an appreciable extent.

The reaction may also be carried out in the presence of gases other than air, for instance, in the presence of gases, such as $SO_2$, $CO_2$ or nitrogen.

Some more or less general considerations regarding the process should be noted, as follows:

Although the complete mechanism of modification may not be fully understood, it may be mentioned that rosin is an organic isocolloid, i. e., a colloidal system in which the dispersed phase and the dispersion medium are both of the same chemical composition, although present in different physical states.

By modification I believe that the relationship or relative proportions of the dispersed phase and dispersion medium may be altered. Moreover, the modification process apparently also involves decarboxylation, the extent of which is usually incomplete. It is here noted that the decarboxylation may involve decarboxylation of the rosin, or of the modifying acid, or of both. In any event it should be kept in mind that although I believe decarboxylation usually takes place, the acid value of the final product is usually somewhat higher than that of a corresponding "blank" experiment. Still further, aggregation or polymerization may take place and possibly also some condensation of the acid with the rosin, and these changes may, in some instances, have the effect of holding the melting point relatively high.

In fact, some of the foregoing effects or reactions (both with respect to the physical consistency of the modified product and also the acid value thereof) may work in one direction and others in the opposite direction. Thus, condensation and/or aggregation during the process may, so to speak, counteract the effect of decarboxylation and the end melting point may be the differential result of the decarboxylating action of the modifying agent and of the solidifying action of condensation and/or aggregation. (Decarboxylation tends to decrease melting point.)

As above mentioned, decarboxylation apparently takes place. Thus, if one calculates the acid value to be expected from a mere mixture of the organic acid with the rosin, it is found that the acid value figure is considerably higher than that of the product. This indicates decarboxylation, probably at least in part of the acid itself, as will appear still more clearly herebelow from analysis of the examples given.

In considering the nature of the modifications, it is to be noted that, while some small loss in weight may occur by volatilization (usually not more than about 15–20%), no appreciable fractional or destructive distillation takes place. With appropriate precautions to avoid distillation the process can usually be carried out without loss of more than 5% or 10%, such small loss as does occur usually comprising water, $CO_2$, etc., at least in major part. As a precaution, the temperature should be kept below the boiling or distillation point of the main reaction product, under the applied reaction conditions of the process. By this precaution, destructive distillation or cracking is positively avoided.

The modified rosin product is quite unique, since the rosin molecule retains almost as many carbon atoms as are present in the initial basic constituents of the rosin, the number of carbon atoms being reduced only by that number involved in the decarboxylation. Still further, the types of constituents of the modified rosin are very few in number, probably not more than two or three, and these constituents are characterized by boiling points all lying within a narrow and relatively high temperature range, as can be demonstrated by subsequent distillation of the modified products. The modified products, for practical purposes, are non-volatile when exposed to the air.

It is of importance in securing various of the foregoing characteristics that the reaction take place without any appreciable concurrent distillation.

Whatever the exact nature of the chemical, colloidal and/or physical changes which are brought about, the treatment provided in accordance with the present invention makes possible or practicable use of my modified rosin products for many purposes for which rosin in its natural state is not suited, or at least not well adaptable, and for which many known rosin derivatives are likewise not satisfactory.

By appropriate selection of modifying agent and treatment conditions, such as temperature, time, vacuum, etc., I am enabled to control various physical properties of the modified products, and notably the acid value, saponification value, iodine value and physical consistency.

In considering the class of organic acids contemplated for use herein, it is noted that, from the point of view of the reaction herein disclosed a saturated organic acid is an organic acid which does not yield an iodine value under the usual iodine value determination procedure (for instance, the Wijs method). Such saturated organic acids include both saturated aliphatic acids and also aromatic acids in which the unsaturation in the ring does not give an iodine value under conditions mentioned just above.

EXAMPLES

In a table given herebelow, there are reproduced the results of some comparative experiments which were conducted under the same conditions, except for certain designated changes which serve to illustrate differences in properties which may be secured by variations in process.

In all cases the experiments of this comparative series were conducted on WW wood rosin (Newport Industries), 1,000 gms. of the rosin being heated in a three liter distilling flask, under atmospheric pressure, i. e., a pressure of about 760 mms. Hg. The treatment period was 5 hours. The treatment temperature indicated represents a fairly close average maintained throughout the 5 hour treatment period (usually within 10° C. plus or minus). Certain results of this group of examples are given in Table I below.

All temperatures are given in degrees centigrade.

Table I

| Ex. No. | Agent | Percent | Temp. | Acid Value | Iodine Value | Melting Point |
|---|---|---|---|---|---|---|
| 1 | Oxalic acid | 5 | 160 | 164.0 | 195.9 | 84.5 |
| 2 | ----do---- | 5 | 250 | 179.5 | 198.8 | 82.0 |
| 3 | ----do---- | 10 | 160 | 172.8 | 194.4 | 80.0 |
| 4 | ----do---- | 12 | 160 | 170.2 | 195.5 | 79.5 |
| 5 | Citric acid | 5 | 160 | 182.0 | 194.5 | 81.0 |
| 6 | ----do---- | 5 | 250 | 159.2 | 180.9 | 79.0 |
| 7 | ----do---- | 10 | 160 | 194.0 | 195.3 | 80.5 |
| 8 | ----do---- | 15 | 160 | 229.2 | 189.7 | 78.2 |
| 9 | Salicylic acid | 5 | 290 | 111.0 | 148.3 | 62.0 |
| 10 | ----do---- | 10 | 160 | 189.7 | 194.7 | 70.5 |
| 11 | ----do---- | 15 | 160 | 199.8 | 194.1 | 64.0 |
| 12 | Tartaric acid | 10 | 160 | 176.7 | 200.2 | 79.0 |
| 13 | ----do---- | 15 | 160 | 173.1 | 212.4 | 79.7 |
| A | (WW Wood Rosin without any treatment). | | | 169.0 | 206.2 | 81.0 |
| B | (Heated without agent.) | | 290 | 133.8 | 167.7 | 71.1 |
| C | ----do---- | | 250 | 161.3 | 201.0 | 79.8 |
| D | ----do---- | | 160 | 164.5 | 206.7 | 85.5 |

Most of the products above were quite solid, although the products of Examples 9 and 11 were very slightly plastic.

At the bottom of the foregoing table the four examples lettered A, B, C, and D indicate the following:

A=the same WW wood rosin as used in all of the other experiments, so as to indicate the acid value, iodine value and melting point of this rosin in its initial untreated state.

B, C, D=blank experiments carried out under the conditions applied to the other experiments, except that no treating agent was employed during the heating.

In determining melting point, the mercury method was used.

The inclusion of items A, B, C, and D in the above table will facilitate analysis of the effects secured by the employment of various different modifying agents. The "blank" experiments should, of course, be compared with various of the numbered experiments conducted at the corresponding temperatures.

The color of the rosin may be changed by the process. In many cases it is possible to secure products of quite light color which is of advantage for a number of purposes including the preparation of varnishes.

The acid numbers of all of the examples are relatively high, which is apparently due in part to the addition of the acidic modifying agent.

The melting points are similar to the corresponding "blank" experiments, being slightly lower in the case of salicylic acid (Examples 9, 10 and 11), this acid being aromatic.

The iodine numbers are also, in general, quite high and indicate that no appreciable polymerization or aggregation took place, and apparently no condensation of the type which would saturate double bonds.

In connection with the foregoing it may be noted that the results indicated by the table are in distinct contrast with certain prior processes, for instance to the known treatment of rosin with maleic anhydride, in which saturation of double bonds and condensation take place, with the result that such products display a marked decrease in iodine number and also a marked rise in melting point.

With regard to the acid value of the products, and the possible decarboxylation, there is presented herebelow in Table II some additional figures for comparative purposes. The same examples are reproduced in Table II, the actual acid value of the products being indicated. In addition, Table II includes a column (identified—"Theoretical acid value") giving the acid value figure to be expected merely from addition of the organic modifying acid to the rosin, without reaction. The final column in Table II indicates the approximate percentage of decarboxylation which the actual acid value represents, when compared with the theoretical acid value expressed as percentage of the latter.

*Table II*

| Ex. No. | Per cent Agent | Temp. | Actual Acid Value | Theoret. Acid Value | Decarb., Per cent |
|---|---|---|---|---|---|
| 1 | 5% Oxalic acid | 160 | 164.0 | 203.0 | 19.2 |
| 2 | do | 250 | 179.5 | 203.0 | 11.6 |
| 3 | 10% Oxalic acid | 160 | 172.8 | 234.0 | 26.2 |
| 4 | 12% Oxalic acid | 160 | 170.2 | 246.0 | 30.8 |
| 5 | 5% Citric acid | 160 | 182.0 | 203.0 | 10.3 |
| 6 | do | 250 | 159.2 | 203.0 | 21.6 |
| 7 | 10% Citric acid | 160 | 194.0 | 234.0 | 17.1 |
| 8 | 15% Citric acid | 160 | 229.2 | 260.0 | 11.8 |
| 9 | 5% Salicylic acid | 290 | 111.0 | 181.0 | 38.5 |
| 10 | 10% Salicylic acid | 160 | 189.7 | 191.0 | 0.7 |
| 11 | 15% Salicylic acid | 160 | 199.8 | 200.0 | 0.1 |
| 12 | 10% Tartaric acid | 160 | 176.7 | 222.0 | 20.4 |
| 13 | 15% Tartaric acid | 160 | 173.1 | 244.0 | 29.1 |
| A | (WW Wood Rosin without any treatment.) | | 169.0 | | |
| B | (Heated without agent.) | 290 | 133.8 | 169.0 | 20.8 |
| C | do | 250 | 161.3 | 169.0 | 4.5 |
| D | do | 160 | 164.5 | 169.0 | 2.6 |

It may be noted in connection with Table II that Example No. 9 (salicylic acid) indicates a relatively large drop in acid value, to a point appreciably below the corresponding "blank" experiment. It appears, therefore, that at the 290° temperature which was employed in Example 9, considerable decarboxylation of the rosin itself took place.

From the above examples it will be seen that the extent of decarboxylation is relatively small and further that increasing the percentage range of the modifying agent somewhat increases the degree of decarboxylation. Because of this it seems likely that the organic acid modifying agent itself is the ingredient which is being decarboxylated, at least in comparison with the rosin molecule.

In connection with the tables above, some general considerations should be kept in mind.

Usually, increase in temperature and/or increase in percentage of acid tends to augment the degree of decarboxylation, and tends also to promote reduction in iodine value.

As to temperature, it is pointed out that in general little decarboxylation, if any, takes place below about 250° C. In fact, there appears to be a fairly critical point in temperature rise at about 270° C., above which decarboxylation becomes more pronounced.

Most of the examples in the tables above were conducted at temperatures below 270° C., and it will be observed that the acid values are relatively high. In addition, the iodine values are also quite high, indicating little, if any, condensation of the type involving saturation of double bonds.

In view of the above, where extensive decarboxylation is to be avoided, the temperature should be kept below 270° C., and preferably be kept not above about 250° C.

Another general consideration is that employment of vacuum during the heating further tends to promote decarboxylation, and vacuum, therefore, should also be avoided where extensive decarboxylation is not desired. It is here noted that use of vacuum is fully disclosed in my copending application filed concurrently herewith, Serial No. 461,797.

The salicylic acid example (Example 9), being conducted at 290° C., indicates an appreciably greater drop in acid value and also in iodine value, thereby confirming the general rules mentioned above.

Benzoic acid may also be used in the process of the present invention. This is demonstrated in Table III just below containing Examples 14 and 15. The experiments of these examples were conducted under the same conditions as those discussed just ahead of Table I.

*Table III*

| Ex. No. | Agent | Per cent | Temp. | Acid Value | Iodine Value | Melting Point |
|---|---|---|---|---|---|---|
| 14 | Benzoic acid | 10 | 160 | 197.2 | 197.4 | 69.0 |
| 15 | do | 15 | 160 | 198.2 | 194.0 | 52.2 |
| A | (WW Wood Rosin without any treatment.) | | | 169.0 | 206.2 | 81.0 |
| D | (Heated without agent.) | | 160 | 164.5 | 206.7 | 85.5 |

The product of Example 15 was very slightly plastic, although the product of Example 14 was quite solid.

As hereinabove mentioned, it is believed that the reaction produced by employing the modifying agents herein disclosed (i. e., saturated organic acids as above defined) may involve condensation of the organic acid with the rosin, although the condensation is not of that type producing saturation of double bonds. With this in mind, the products of various examples given above (products of Examples 4, 8, 11, 13 and 14, and also of Blank Experiment B) were dissolved in petroleum ether and the solution then washed out several times with water in a separatory funnel so as to separate the water soluble portion of the product from the remainder. (In instances where the organic acid employed was of the type which is only readily soluble in hot water, for instance, with benzoic acid and salicylic acid, hot water was used in the separation process.)

Since the rosin acid is insoluble in water the above process separated out the free organic acid.

Acidity determinations were then taken by titrating the combined water extracts and the acidity was expressed in acid value units in order to determine the acid number represented by the acid extracted in the water separation, and calculations were made to show the percentage of the organic acid which did not separate with the water extraction. This percentage in all instances was relatively high, indicating that condensation had taken place, even though some decarboxylation may have also occurred.

The view that condensation occurs in this process is further demonstrated by additional calculations, as follows:

If the actual acid value of the treated rosin be subtracted from the theoretical to be expected from the mere addition of the organic acid, and the difference (representing loss during the treatment) be added to the acid value extracted from the treated material in the manner above described, it will be found that the sum of these two "losses" is still very considerably less than the difference between the acid value portion of the organic acid in the theoretical acid value and the acid value extracted. This demonstrates that even if all decarboxylation should be attributed to the organic acid, even then a considerable condensation must have taken place. Since at least a portion, and probably most of the decarboxylation occurred in the rosin acids, the degree of condensation is most probably considerably higher than the calculated minimums would indicate.

The results of the foregoing calculations are indicated below in Tables No. IVa and IVb.

Table IVa

| Ex. No. | A Theoretical Acid Number | B Actual Acid No. | C Acid No. Portion of Organic Acid in Theoretical Acid No. | D Acid No. in $H_2O$ Extracts | E Difference | F Per cent Org. Acid Used by Rosin (Condensed or Decarboxylated) |
|---|---|---|---|---|---|---|
| 4 | 246 | 170.2 | 106.56 | 6.99 | 99.57 | 98.4 |
| 8 | 260 | 229.2 | 131.4 | 18.67 | 112.73 | 85.8 |
| 11 | 200 | 199.8 | 60.9 | 19.41 | 41.49 | 68.1 |
| 13 | 244 | 173.1 | 112.05 | 7.92 | 104.13 | 92.9 |
| 14 | 207 | 198.2 | 68.85 | 12.89 | 55.96 | 81.3 |
| B | 169.3 | 164.5 | | 1.5 | | |

Table IVb

| Ex. No. | G Loss in Acid No. (A Minus B) | D Extracted Acid No. | H Total of G Plus D | E Difference | I Minimum Condensed Acid No. |
|---|---|---|---|---|---|
| 4 | 75.8 | 6.99 | 82.79 | 99.57 | 16.78 |
| 8 | 30.8 | 18.67 | 49.47 | 112.73 | 63.26 |
| 11 | 0.2 | 19.41 | 19.61 | 41.49 | 21.88 |
| 13 | 70.9 | 7.92 | 78.82 | 104.13 | 25.31 |
| 14 | 8.8 | 12.89 | 21.69 | 55.96 | 34.27 |
| B | 4.8 | 1.5 | 6.3 | | |

Key:

| Example No. | Agent |
|---|---|
| 4 | 12% Oxalic Acid. |
| 8 | 15% Citric Acid. |
| 11 | 15% Salicylic Acid. |
| 13 | 15% Tartaric Acid. |
| 14 | 15% Benzoic Acid. |
| B | Blank. |

From the above it will be seen that there is considerable remaining acid value (column I in Table IVb) which represents the minimum condensation which has taken place.

The products of the foregoing examples and others given hereinbefore, yield varnish solutions having exceptional characteristics with respect to drying, and in this respect the materials in question are distinguished from those containing maleic treated rosins, wherein stickiness is retained for an extended period of time. It is thought that this difference may be due to the fact that treatment with maleic acid involves saturation of double bonds, which is in contrast with treatment with the saturated organic acids hereinabove referred to.

Certain variations in procedure may be adopted.

For example, certain gases, such as $SO_2$, $CO_2$ or nitrogen can be either bubbled through the reaction mass or employed as a blanket on the surface of the batch undergoing treatment. Expedients of this type may serve to exclude air from the reaction and may be utilized for their supplemental effect on the material being treated, this subject being more fully considered in my co-pending application Serial No. 386,371, filed April 1, 1941 (now Patent 2,311,200). It is here further noted that certain features herein disclosed are also disclosed in my prior U. S. applications Serial No. 318,650, filed February 12, 1940 (now Patent 2,298,270), Serial No. 359,425 (now Patent No. 2,213,944) and Serial No. 143,786 (now Patent No. 2,189,772).

Moreover, as disclosed in the above mentioned copending applications, still other variations in process may be employed for a number of different purposes, but it is not thought necessary to discuss these fully herein, since reference may be made to the copending applications for that purpose. In passing, however, it is noted that additional treating agents, of a supplemental character, may also be present during the reaction, among which might be mentioned dissolution promoting agents of the type disclosed in my issued Patent 2,293,038. Various combinations of modifying agents may also be used for different purposes, including combinations of the modifying agents above disclosed, as well as combinations of the modifying agents herein disclosed with agents disclosed in other of my applications mentioned above as well as hereinafter.

It is further to be noted that in general increasing any one or all of the variables: namely, temperature, time of treatment and percentage of modifying agent, increases the extent of modification, at least in one respect or another. It will be understood that the foregoing is a general rule normally applicable within the ranges of operation above indicated, although, as to at least some variables, there may be limits beyond which the general rule does not apply. For instance, excessive increase in temperature may substantially alter the character of the process. On the other hand, in instances where substantial condensation takes place, excessive increase in percentage of modifying agent may yield a harder product than a lower percentage of the modifying agent.

In considering the starting material on which the process may be employed, it is first noted that the process brings about changes both of a colloidal and also of a chemical nature. It is important, however, to bear in mind that the process essentially involves a reaction with the rosin molecule, that is, with the type of molecules of which the basic constituents of natural rosin are composed. Therefore, while rosin itself, such as gum or wood rosins, represents perhaps the most important starting material to which the process is adaptable, it is noted that the process may be employed on rosin which has been pretreated in various ways, or on mixed or chemically condensed materials incorporating rosin, since the reaction will take place wherever the rosin molecule is present, provided, of course, that the physical or chemical state or "environment" of the rosin molecule is not such as to prevent the reaction from taking place.

It may also be mentioned that there are other natural resins, such as copals, which act similarly to rosin by treatment in accordance with this invention. In fact, the reaction may be carried out on any of the natural resins containing high molecular resin acids. Therefore, wherever any such other natural resin behaves similarly to rosin, it is herein considered as an equivalent.

Copals are fossil gums which have to be "fused" before becoming soluble in organic solvents and miscible with fatty oils. When copals are used in the present process, they should be employed in the fused state.

The modified product of this invention may if desired, be subject to other treatment, depending upon the use for which it is intended. Thus, for example, the modified products may be vulcanized with sulphur. The modified resin products secured in accordance with the foregoing, may be vulcanized as such, or in solutions, such as varnish solutions (in the latter case with sulphur chloride).

Further, they may be converted into emulsions and used for various purposes in that form.

In the event sulphur or other sulphur-like vulcanizing agents are used, vulcanization, for certain purposes, is desirably carried out at temperatures between about 120° C. and 200° C. For purposes where vulcanization is to be effected at lower temperatures, for instance, at room temperature, sulphur chloride, or similarly acting vulcanizing agents, should be used. In instances where the vulcanization is carried out in a varnish solution, the sulphur chloride treatment is especially practical.

The vulcanized resin products made in accordance with the invention have valuable properties for a number of purposes including the making of protective coatings.

As is mentioned in my copending application Serial No. 386,371, filed April 1, 1941 (now Patent 2,311,200), the modified rosin products may be subject to still other supplemental treatments, such for instance as esterification, as by treating with glycerine or other polyhydric alcohols, such as glycols, pentaerythritol, mannitol, sorbitol, etc.

Treatment with alcohols may be particularly desirable in the case of the products produced in accordance with the method of the present application, because of the fact that such products usually have quite a high acid value.

Certain of the modified rosin products produced in accordance with examples given in the tables above were further treated to form glycerides. In each case this treatment was effected as follows:

5% glycerin was added and the rosin product and glycerin heated to 270° C. and maintained at that temperature for two hours. This was done in a flask with a distilling head.

Following the step mentioned above, the product was further heated with an additional 3% of glycerin, the flask at this time being open. The temperature was raised to 290° C. and maintained at that temperature for one hour.

The result of the esterification is indicated in Table V below. In this table the same example numbers are used as those employed on the corresponding examples in the preceding tables, the particular acid also being specified.

For purposes of further comparison a 25 gallon long varnish was cooked (for about 2 hours) with each one of the esterified rosin products, certain figures with respect to the varnish also being included in the table. All of the varnishes were made with the glycerides plus heavy bodied linseed oil, thinned with mineral spirits, driers of known type being added.

Table V

| Ex. No. | Agent | Percent | Glyceride | | Varnish | |
|---|---|---|---|---|---|---|
| | | | Acid Value | Melting Point | Viscosity (Gardner) | Color (Hellige) |
| 4 | Oxalic Acid | 12 | 52.8 | 83.0 | C | 14 |
| 8 | Citric Acid | 15 | 44.0 | 96.0 | B | 13 |
| 11 | Salicylic Acid | 15 | 20.9 | 68.0 | B-C | 13 |
| 13 | Tartaric Acid | 15 | 49.2 | 91.2 | B | 13 |
| 15 | Benzoic Acid | 15 | 45.7 | 66.0 | C | 14 |

Note.—All varnishes had 50% non-volatile content.

The foregoing demonstrates the effect of esterification on the acid value and melting point.

Drying tests on the foregoing varnishes indicated overnight drying was in general quite good, the varnish containing rosin treated with tartaric acid being very good and superior to any of the others. Those incorporating rosin treated with oxalic acid and citric acid were also quite good.

For further comparison, a similar varnish containing a commercial ester gum was subject to the drying test in a manner parallel to the treatment of the other examples and this particular varnish was very much inferior to the others. As a still further comparison, a rosin was treated with maleic anhydride and the maleic rosin esterified in the manner above described and then incorporated in a varnish of the same composition, this varnish being tested along with the others under the same conditions. After overnight drying, the varnish containing the maleic treated rosin was still very tacky.

I claim:

1. A process for preparing a condensation product of rosin which process comprises incorporation in the rosin from 2% to 30% of an organic acid selected from the class consisting of oxalic acid, citric acid, salicylic acid, tartaric acid and benzoic acid, and heating the mixture between about 160° C. and 350° C., but not above the temperature at which extensive decarboxylation occurs under the conditions of the process, said heating being carried out for at least one half hour and until condensation takes place between the rosin and the acid used and further comprising esterification of the modified rosin.

2. A process for preparing a condensation product of rosin which process comprises incorporation in the rosin from 2% to 30% of an organic acid selected from the class consisting of oxalic acid, citric acid, salicylic acid, tartaric acid and benzoic acid, and heating the mixture between about 160° C. and 350° C., but not above the temperature at which extensive decarboxylation occurs under the conditions of the process, said heating being carried out for at least one half hour and until condensation takes place between the rosin and the acid used and further comprising esterification of the modified rosin with a polyhydric alcohol.

3. A process for preparing a condensation product of rosin which process comprises incorporation in the rosin from 2% to 30% of an organic acid selected from the class consisting of oxalic acid, citric acid, salicylic acid, tartaric acid and benzoic acid, and heating the mixture between about 160° C. and 350° C., but not above the temperature at which extensive decarboxylation occurs under the conditions of the process, said heating being carried out for at least one half hour and until condensation takes place between the rosin and the acid used and further comprising esterification of the modified rosin with glycerin.

4. A process for preparing a condensation product of rosin which process comprises incorporation in the rosin from 2% to 30% of an organic acid selected from the class consisting of oxalic acid, citric acid, salicylic acid, tartaric acid and benzoic acid, and heating the mixture between about 160° C. and 350° C., but not above the temperature at which extensive decarboxylation occurs under the conditions of the process, said heating being carried out for at least one half hour and until condensation takes place between the rosin and the acid used and further comprising esterification of the modified rosin with pentaerythritol.

5. A process for preparing a condensation product of rosin which process comprises incorporation in the rosin from 2% to 30% of an organic acid selected from the class consisting of oxalic acid, citric acid, salicylic acid, tartaric acid and benzoic acid, and heating the mixture between about 160° C. and 350° C., but not above the temperature at which extensive decarboxylation occurs under the conditions of the process, said heating being carried out for at least one half hour and until condensation takes place between the rosin and the acid used and further comprising esterification of the modified rosin with sorbitol.

6. A process in accordance with claim 1 in which the percentage of the organic acid used is from about 2% to about 15%.

7. An esterified condensation product of rosin comprising rosin reacted with from 2% to 30% of a saturated organic acid selected from the class consisting of oxalic acid, citric acid, salicylic acid, tartaric acid and benzoic acid.

8. A product in accordance with claim 7 in which the esterified condensation product of rosin is a polyhydric alcohol ester.

9. A product in accordance with claim 7 in which the esterified condensation product of rosin is a glycerin ester.

10. A product in accordance with claim 7 in which the esterified condensation product of rosin is a pentaerythritol ester.

11. A product in accordance with claim 7 in which the esterified condensation product of rosin is a sorbitol ester.

LASZLO AUER.

REFERENCES CITED

The following references are of record in the file of this patent:

UNITED STATES PATENTS

| Number | Name | Date |
|---|---|---|
| 1,820,265 | Bent | Aug. 25, 1931 |
| 1,881,893 | Oliver et al. | Oct. 11, 1932 |
| 1,923,507 | Rosenblum | Aug. 22, 1933 |
| 1,975,211 | Johnston | Oct. 2, 1934 |
| 2,011,673 | Binapfl | Aug. 20, 1935 |

FOREIGN PATENTS

| Number | Country | Date |
|---|---|---|
| 287,943 | Great Britain | Mar. 30, 1928 |